US012630111B2

(12) United States Patent
Weston et al.

(10) Patent No.: US 12,630,111 B2
(45) Date of Patent: May 19, 2026

(54) SEATBELT ASSEMBLY INCLUDING SEATBELT PAD

(71) Applicant: Ford Global Technologies, LLC, Dearborn, MI (US)

(72) Inventors: Keith Weston, Canton, MI (US); David D. Friske, Wolverine Lake, MI (US); Michael Joseph Niksa, Royal Oak, MI (US); Lorne Forsythe, Wind Lake, WI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 18/667,100

(22) Filed: May 17, 2024

(65) Prior Publication Data
US 2025/0353460 A1      Nov. 20, 2025

(51) Int. Cl.
B60H 1/22        (2006.01)
B60R 11/02      (2006.01)
(Continued)

(52) U.S. Cl.
CPC ........... B60R 22/12 (2013.01); B60H 1/2215 (2013.01); B60R 11/0217 (2013.01); H05B 3/342 (2013.01)

(58) Field of Classification Search
CPC .......... B60H 1/00; B60H 1/2215; B60H 1/24; B60H 1/241; B60R 11/00; B60R 11/02; B60R 11/0217; B60R 11/0223; B60R 11/0229; B60R 11/0235; B60R 11/0247; B60R 22/00; B60R 22/12; B60R 22/14;

B60R 22/18; B60R 2022/006; B60R 2022/1818; B60R 2022/1843; H05B 3/00; H05B 3/20; H05B 3/34; H05B 3/342;
(Continued)

(56) References Cited

U.S. PATENT DOCUMENTS

| | | | | | |
|---|---|---|---|---|---|
| 4,741,574 A | * | 5/1988 | Weightman | ............. | B60R 22/00 |
| | | | | | 280/801.1 |
| 5,005,865 A | * | 4/1991 | Kruse | .................... | B60R 22/14 |
| | | | | | 280/801.1 |

(Continued)

FOREIGN PATENT DOCUMENTS

| | | | | | |
|---|---|---|---|---|---|
| CN | 120606775 A | * | 9/2025 | ........... | B60R 22/023 |
| DE | 102018124239 A1 | * | 4/2020 | ............. | B60R 22/12 |

(Continued)

OTHER PUBLICATIONS

Sandela, A Smart Seat Belt, Computer Science Department, San Jose State University, pp. 1-4. 2014.

*Primary Examiner* — Jason D Shanske
*Assistant Examiner* — Daniel M. Keck
(74) *Attorney, Agent, or Firm* — Burris Law, PLLC

(57) ABSTRACT

A seatbelt assembly includes a seatbelt webbing and a pad. The pad is attached to the seatbelt webbing. The pad has a generally annular shape that defines a main aperture extending through the pad in a longitudinal direction of the pad. A portion of the seatbelt webbing extends through the main aperture. The pad includes a lattice structure and a cover layer. The lattice structure surrounds the main aperture. The lattice structure is formed of a resilient material and defines a plurality of openings that permit airflow through the lattice structure. The cover layer is disposed about the lattice structure.

20 Claims, 7 Drawing Sheets

(51) Int. Cl.
    *B60R 22/12*         (2006.01)
    *H05B 3/34*         (2006.01)

(58) Field of Classification Search
    CPC ... H05B 3/36; H05B 3/54; H05B 3/56; H05B 3/565; H05B 3/58
    USPC ........................... 280/801.1; 340/438, 457.1
    See application file for complete search history.

(56)                References Cited

U.S. PATENT DOCUMENTS

| | | | | |
|---|---|---|---|---|
| 5,248,187 | A * | 9/1993 | Harrison | G08B 21/06 297/488 |
| 5,765,869 | A * | 6/1998 | Huber | B60R 22/195 280/733 |
| 6,273,467 | B1 * | 8/2001 | Berke | B60R 22/14 280/808 |
| 8,777,323 | B2 * | 7/2014 | Merrill | B60R 22/14 297/483 |
| 9,010,808 | B2 * | 4/2015 | Kampondeni | B60R 22/00 280/805 |
| 9,463,738 | B2 | 10/2016 | Salter et al. | |
| 9,463,770 | B2 | 10/2016 | Faughn | |
| 9,669,798 | B1 * | 6/2017 | Maitland | B60R 22/00 |
| 10,143,043 | B1 | 11/2018 | Elson et al. | |
| 10,569,735 | B2 * | 2/2020 | Elson | B60R 22/12 |
| 10,821,934 | B2 | 11/2020 | Hall et al. | |
| 11,014,520 | B2 * | 5/2021 | Murakami | B60R 22/14 |
| 11,590,921 | B1 * | 2/2023 | Farooq | B60R 22/18 |
| 2002/0003346 | A1 * | 1/2002 | Haack | B60R 22/14 280/751 |
| 2006/0125227 | A1 * | 6/2006 | Beczkowski | B60R 22/023 280/801.1 |
| 2017/0327075 | A1 * | 11/2017 | Murakami | B60R 21/18 |
| 2019/0176567 | A1 * | 6/2019 | Elson | B60H 1/00271 |
| 2020/0298795 | A1 * | 9/2020 | Sokolowski | B60R 22/12 |
| 2021/0146879 | A1 * | 5/2021 | Akoma | B60R 22/14 |
| 2021/0309179 | A1 | 10/2021 | Zhang | |

FOREIGN PATENT DOCUMENTS

| | | | | |
|---|---|---|---|---|
| EP | 2803538 | A1 * | 11/2014 | B60R 21/18 |
| FR | 2530208 | A1 * | 1/1984 | B60R 22/00 |
| IT | RN20100017 | A1 * | 7/2010 | B60R 22/14 |
| WO | WO-2012058422 | A1 * | 5/2012 | B60R 21/18 |
| WO | WO-2014083408 | A1 * | 6/2014 | B60N 2/265 |
| WO | WO-2015190152 | A1 * | 12/2015 | B60R 21/18 |
| WO | WO-2024075776 | A1 * | 4/2024 | B62J 1/18 |

* cited by examiner

210

226

222    218

SEATBELT ASSEMBLY INCLUDING SEATBELT PAD

FIELD

The present disclosure relates to a seatbelt assembly, and more particularly to a seatbelt assembly including a seatbelt pad.

BACKGROUND

The statements in this section merely provide background information related to the present disclosure and may not constitute prior art.

Vehicles typically include a seatbelt with a seatbelt webbing that is configured to engage a user in a seat of the vehicle. Some users are looking for additional features that enhance the vehicle experience. Additionally, it is anticipated that technology and the regulatory framework may evolve in the future to where use of such additional features becomes safe and permissible.

The teachings of the present disclosure provide an alternative to typical seatbelts.

SUMMARY

This section provides a general summary of the disclosure and is not a comprehensive disclosure of its full scope or all of its features.

In one form, the present disclosure provides a seatbelt assembly including a seatbelt webbing and a pad. The pad is attached to the seatbelt webbing. The pad has a generally annular shape that defines a main aperture extending through the pad in a longitudinal direction of the pad. A portion of the seatbelt webbing extends through the main aperture. The pad includes a lattice structure and a cover layer. The lattice structure surrounds the main aperture. The lattice structure is formed of a resilient material and defines a plurality of openings that permit airflow through the lattice structure. The cover layer is disposed about the lattice structure.

According to a variety of alternate forms that can be used with the seatbelt assembly of the above paragraph individually or in any combination thereof: the lattice structure has a first region that has a first lattice geometry and a second region that has a second lattice geometry, wherein the first lattice geometry is denser than the second lattice geometry; the seatbelt webbing is disposed between the first and second regions; the first region is located closer to a first end longitudinal end of the pad than the second region; the cover layer defines a plurality of vent apertures that provide fluid communication between the lattice structure and an exterior of the pad, wherein the second region is aligned with the vent apertures; the cover layer defines a plurality of vent apertures that provide fluid communication between the lattice structure and an exterior of the pad; the lattice structure is a same material as the cover layer, wherein the lattice structure and the cover layer are formed via an additive manufacturing process; the cover layer includes a plurality of flanges that extend in the longitudinal direction, the flanges being attached directly to the seatbelt webbing; the pad further comprises an electronic device and the seatbelt webbing includes at least two conductors, the at least two conductors in electrical communication with the electronic device and configured to provide power to the electronic device; the seatbelt assembly can further include a first wire and a second wire, wherein the first and second wires extend through the plurality of openings defined by the lattice structure to electrically couple the at least two conductors to the electronic device; the pad further includes at least two conductive ink traces, wherein the at least two conductive ink traces are printed on or within the cover layer and electrically couple the at least two conductors to the electronic device; wherein the electronic device includes an electroluminescent layer disposed on or within the cover layer; the electronic device includes a speaker; the electronic device includes a sensor; the electronic device includes a fan, the fan configured to draw air through the lattice structure; the electronic device includes a resistance heating element; the pad further comprises a resonance chamber, the resonance chamber having a predetermined natural frequency configured to vibrate in response to a predetermined vehicle noise or vibration.

In yet another form, the present disclosure provides a seatbelt assembly including a seatbelt webbing and a pad. The seatbelt webbing includes at least two conductors. The pad is attached to the seatbelt webbing. The pad has a generally annular shape that defines a main aperture extending through the pad in a longitudinal direction of the pad. A portion of the seatbelt webbing extends through the main aperture. The pad includes a lattice structure, a cover layer, and an electronic device. The lattice structure surrounds the main aperture. The lattice structure is formed of a resilient material and defines a plurality of openings that permit airflow through the lattice structure. The cover layer is disposed about the lattice structure. The cover layer defines a plurality of vent apertures that provide fluid communication between the lattice structure and an exterior of the pad. The electronic device is coupled to the at least two conductors to receive power therefrom. The electronic device includes at least one of a speaker and an electroluminescent layer disposed on or within the cover layer.

According to a variety of alternative forms, that can be used with the seatbelt assembly of the above paragraph individually or in any combination thereof: the lattice structure has a first region that has a first lattice geometry and a second region that has a second lattice geometry, wherein the first lattice geometry is denser than the second lattice geometry; the pad further includes at least two conductive ink traces, wherein the at least two conductive ink traces are printed on or within the cover layer and electrically couple the at least two conductors to the electronic device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
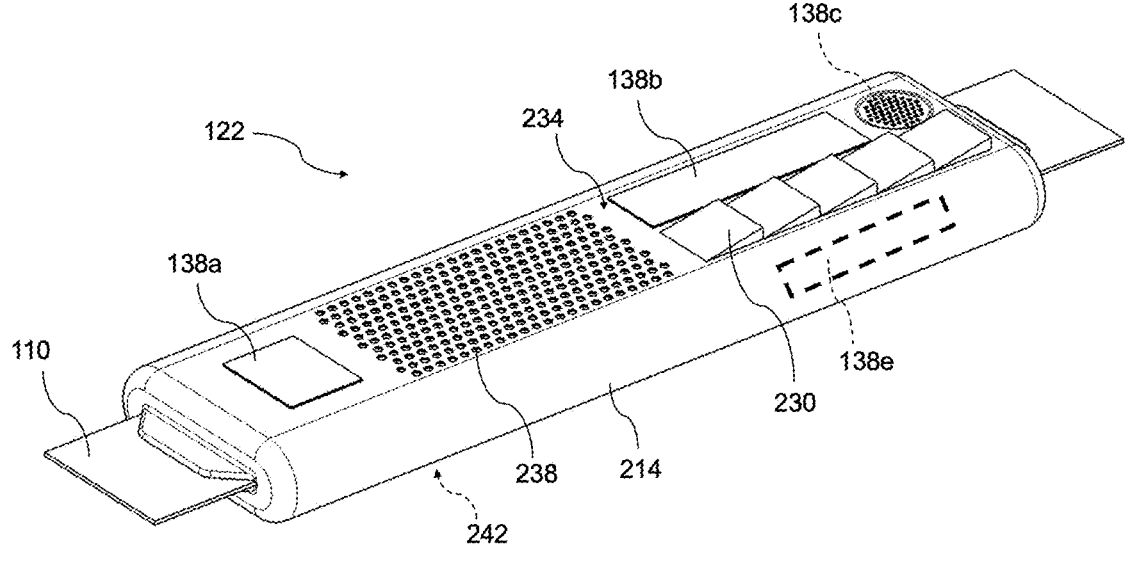
FIG. 2 is a perspective view of a portion of the seatbelt assembly of FIG. 1, illustrating a seatbelt pad of the seatbelt assembly according to one form of the present disclosure.
Figure 3:
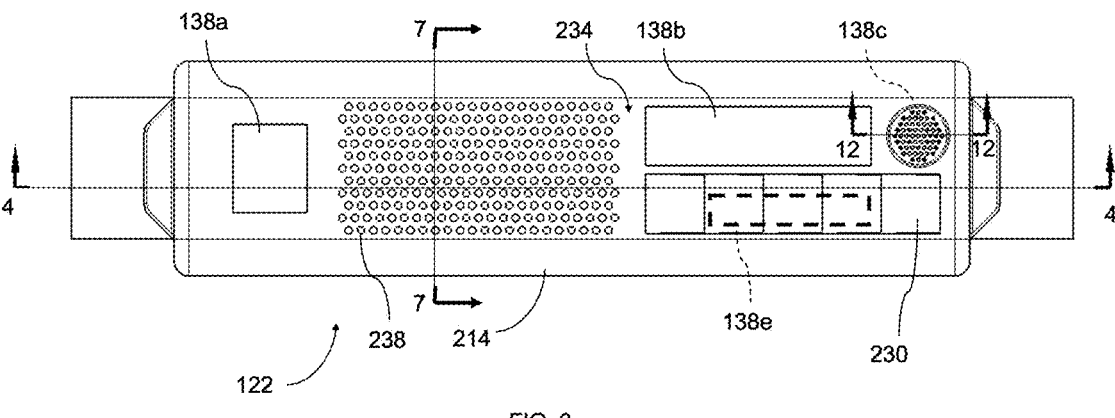
FIG. 3 is a front view of the portion of the seatbelt assembly of FIG. 2.
Figure 11:
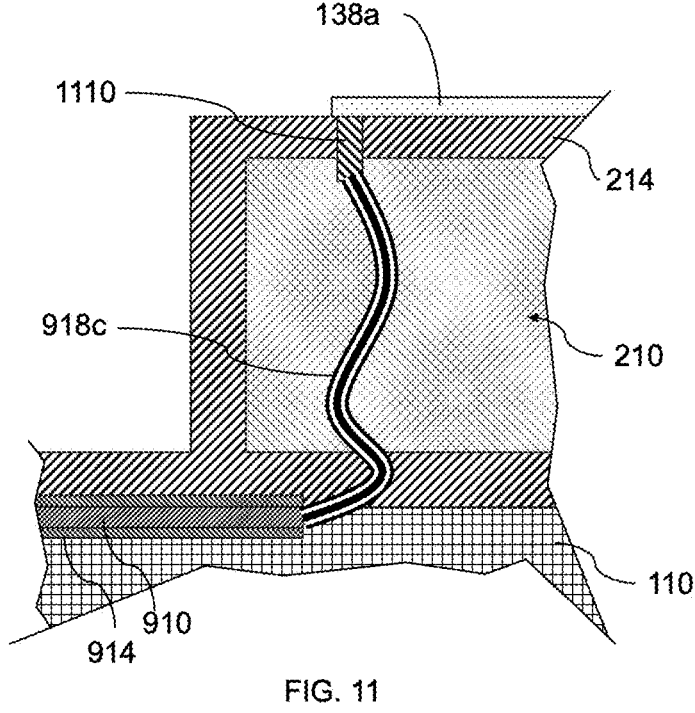
Figure 12:
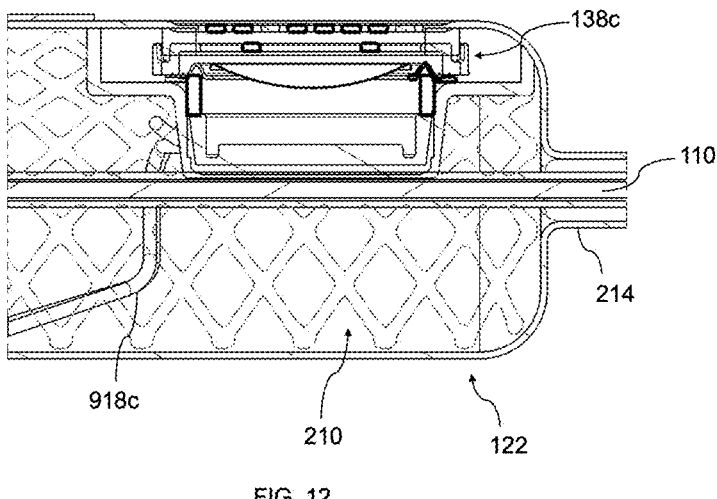

FIG. 11 is a schematic cross-sectional view of a portion of the seatbelt pad of FIG. 2, illustrating yet another configuration of an electronic connection for an electronic device of the seatbelt pad, according to the present disclosure; and FIG. 12 is a cross-sectional view of a portion of a seatbelt pad of FIG. 2, taken along line 12-12 shown in FIG. 3, illustrating an acoustic device of the seatbelt pad, according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
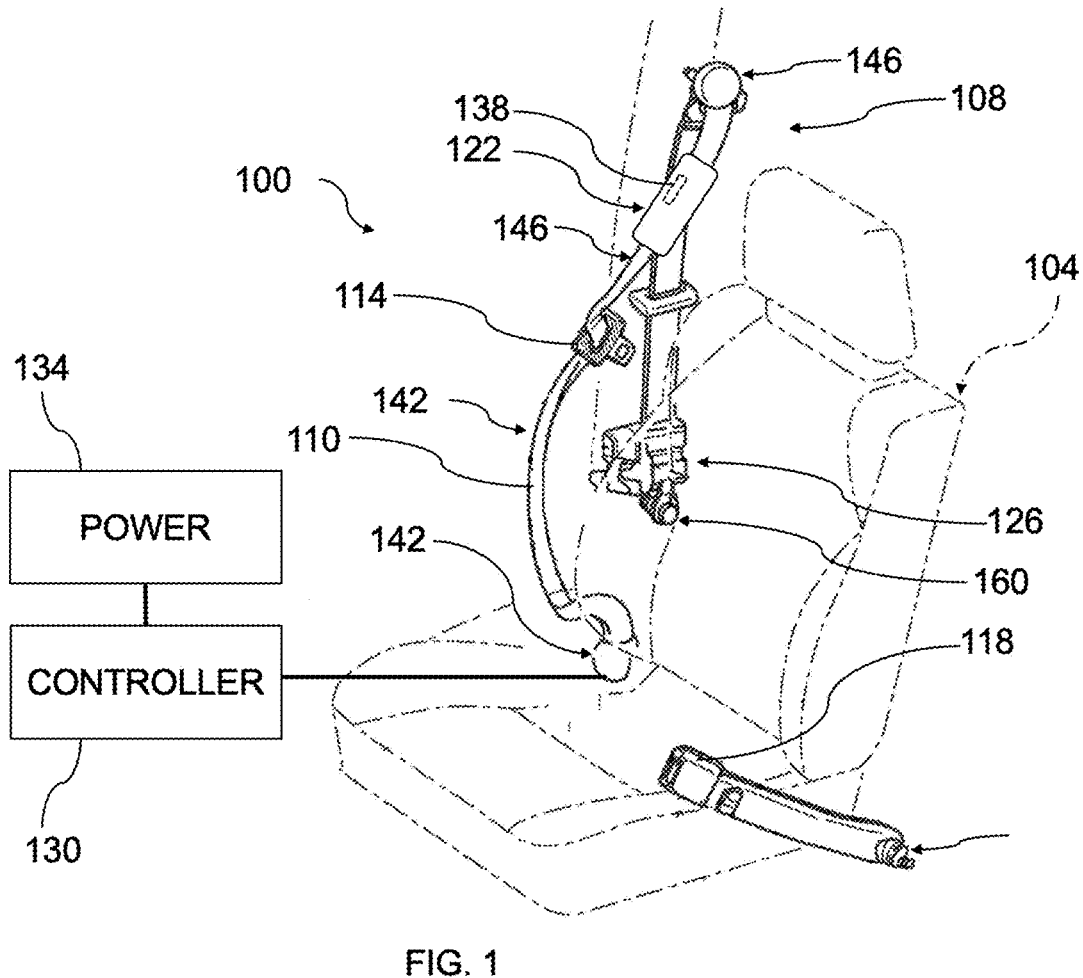
FIG. 1 is a schematic perspective view of an interior of a vehicle, illustrating a seat and seatbelt assembly according to the present disclosure.

Referring to FIG. 1, a vehicle 100 includes a seat 104 and a seatbelt assembly 108. The vehicle 100 can be any type of vehicle including, but not limited to, automobiles, trucks, recreational vehicles, commercial vehicles, off-road vehicles, aquatic vehicles, aircraft, military vehicles, industrial equipment, farm equipment, rail mounted vehicles, and amusement rides, among others. The seat 104 is mounted to a structural portion (not shown) of the vehicle 100 and is any suitable type of seat configured to support a human occupant (not shown). In the example provided, the vehicle 100 is an automobile or truck and the seat 104 is mounted to an interior thereof (i.e., a passenger compartment), though other configurations can be used.

The seatbelt assembly 108 includes a seatbelt webbing 110, a first buckle part 114, a second buckle part 118, and a seatbelt pad 122. The seatbelt assembly 108 may optionally include a retractor 126. The seatbelt assembly 108 may also optionally include a controller 130 and a power source 134.

The controller 130 (also referred to as a control module) is in electrical communication with the seatbelt pad 122, as discussed in greater detail below. In one form, the controller 130 is a main controller of the vehicle 100 such as the Electronic Control Unit (ECU) or Electronic Control Module (ECM), for example. In another form, the controller 130 is separate from the main controller of the vehicle 100 and can be in communication with the main controller. In one form, the controller 130 may be configured to control or otherwise process signals from a variety of systems of the vehicle 100 in addition to the seatbelt assembly 108. In another form, the controller 130 may be dedicated to the seatbelt assembly 108. In the example provided, the controller 130 is located within the vehicle 100 at a location remote from the seatbelt pad 122. In another form, not specifically shown, the controller 130 can be located on or within the seatbelt pad 122.

The power source 134 is configured to provide electrical power to one or more electrical components 138 of the seatbelt pad 122. In the example provided, the power source 134 is located remotely from the seatbelt pad 122. In other words, the power source 134 is not located on or within the seatbelt pad 122. In another form, not specifically shown, the power source 134 may be located on or in the seatbelt pad 122.

In one form, the power source 134 can be in electrical communication with the controller 130 and the controller 130 can selectively provide the electrical power to the one or more electrical components 138 of the seatbelt pad 122. In another form, the power source 134 is in direct electrical communication with the seatbelt pad 122 and the controller 130 is configured to send and receive control signals to the one or more electrical components 138 of the seatbelt pad 122 to control operation of the one or more electrical components 138.

The power source 134 can be any suitable type of power source configured to store and release electrical power such as a battery or supercapacitor for example. In the example provided, the power source 134 is the main battery of the vehicle 100 and is configured to provide power to all of the systems of the vehicle 100 in addition to the seatbelt pad 122 such as, but not limited to, engine systems, HVAC (heating, ventilation, and air conditioning) systems, and/or infotainment systems, in addition to the seatbelt pad 122. In another form, the power source 134 can be dedicated to a small number of systems including the seatbelt pad 122. In yet another form, the power source 134 can be dedicated solely to the seatbelt pad 122. In one form, the vehicle 100 can be an electric vehicle and the power source 134 can also be configured to provide electric power to electric drive motors configured to propel the vehicle 100.

The seatbelt webbing 110 is a substantially flat, woven fabric. In the example provided, the seatbelt webbing 110 is configured to provide a lap belt portion 142 and a chest belt portion 146, though other configurations can be used, such as a multi-point harness for example. In the example provided, the lap belt portion 142 is the portion of the seatbelt webbing 110 between the first buckle part 114 and an end of the seatbelt webbing 110 that is secured to a first anchor point 152. In the example provided, the chest belt portion 146 is the portion of the seatbelt webbing 110 between the first buckle part 114 and a second anchor point 156.

In the example provided, the second anchor point 156 includes a pulley and the seatbelt webbing 110 passes through the pulley and a second end of the seatbelt webbing 110 is attached to the retractor 126. The retractor 126 is secured at a third anchor point 160 and can be configured to generally lock the length of the seatbelt webbing 110, or to retract the length or let out more length of the seatbelt webbing 110, depending on operational conditions. In the example provided, the first buckle part 114 is slidable along the seatbelt webbing 110 such that the lengths of the lap belt portion 142 and of the chest belt portion 146 can vary depending on the location of the first buckle part 114 and how much of the seatbelt webbing 110 is retracted in the retractor 126.

The first buckle part 114 is configured to removably latch to the second buckle part 118. The first buckle part 114 can couple to the second buckle part 118 in any suitable manner. The second buckle part 118 is secured to a fourth anchor point 164 on a laterally opposite side of the seat 104. In the example provided, when the first buckle part 114 is coupled to the second buckle part 118, the lap belt portion 142 is configured to span across the lap of an occupant (not shown) of the seat 104 and the chest belt portion 146 is configured to span across the chest of the occupant. The seatbelt pad 122 is coupled to the chest belt portion 146 of the seatbelt webbing 110. In the example provided, the seatbelt pad 122 is fixedly connected to the seatbelt webbing 110 such that the seatbelt pad 122 cannot slide along the seatbelt webbing 110 (e.g., stitched to the seatbelt webbing 110). In another configuration, the seatbelt pad 122 is not fixed to the seatbelt webbing 110 and can slide along the seatbelt webbing 110.

Figure 4:
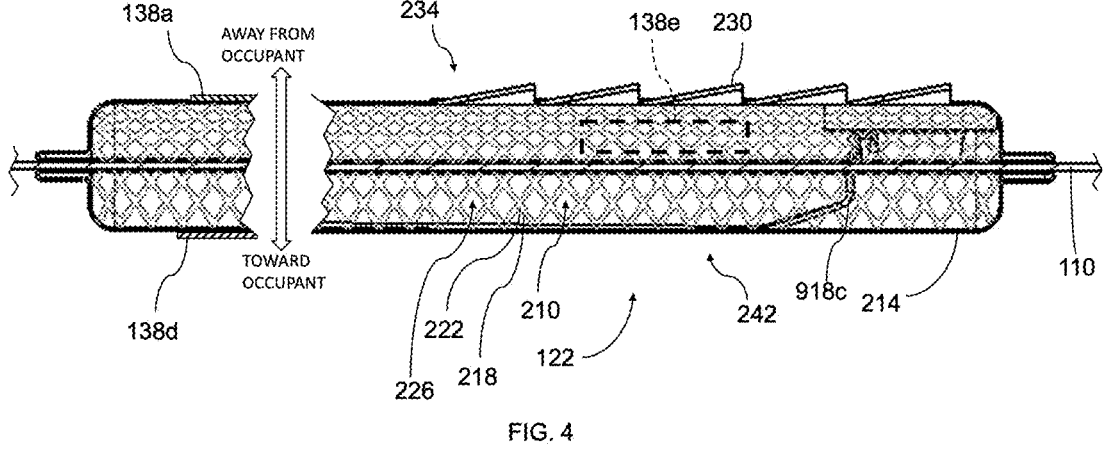
FIG. 4 is a cross-sectional view of the portion of the seatbelt assembly of FIG. 2, taken along plane 4-4, shown in FIG. 3, illustrating an internal structure of the seatbelt pad having a first form according to the present disclosure.

Referring to FIGS. 2-4, an example of the seatbelt pad 122 is illustrated. The seatbelt pad 122 includes a lattice structure 210 and a cover layer 214. The seatbelt pad 122 may optionally also include the one or more electrical components (labeled and schematically shown in FIG. 1 as 138). In the example provided, the seatbelt pad 122 includes a plurality of the electrical components 138 (FIG. 1), which are more specifically labeled in FIGS. 2-4 as a first electrical component 138*a*, a second electrical component 138*b*, a third electrical component 138*c*, a fourth electrical component 138*d*, and a fifth electrical component 138*e*. In the example provided, the first electrical component 138*a* is a light generating component and is also referred to herein as the first lighting component 138*a*, though other types of electrical components can be used. In the example provided, the second electrical component 138*b* is a light generating component and is also referred to herein as the second lighting component 138*b*, though other types of electrical components can be used. In the example provided, the third electrical component 138*c* is a sound generating component and is also referred to herein as the speaker 138*c*, though other types of electrical components can be used. In the example provided, the fourth electrical component 138*d* is a sensor and is also referred to herein as the sensor 138*d*, though other types of electrical components can be used. In the example provided, the fifth electrical component 138*e* is an electric fan and is also referred to herein as the fan 138*e*, though other types of electrical components can be used. While five electrical components 138 (i.e., 138*a*-138*e*) are illustrated, the seatbelt pad 122 may be constructed with as few as no electrical components or with any number of electrical components, including less than five, equal to five, or more than five. The electrical components used can be any one of the examples provided or may be other types of electrical components not specifically described. Some non-limiting examples of another types of electrical component includes a heating element, a microphone, and an input device (e.g., button or touch sensor).

Figure 8:
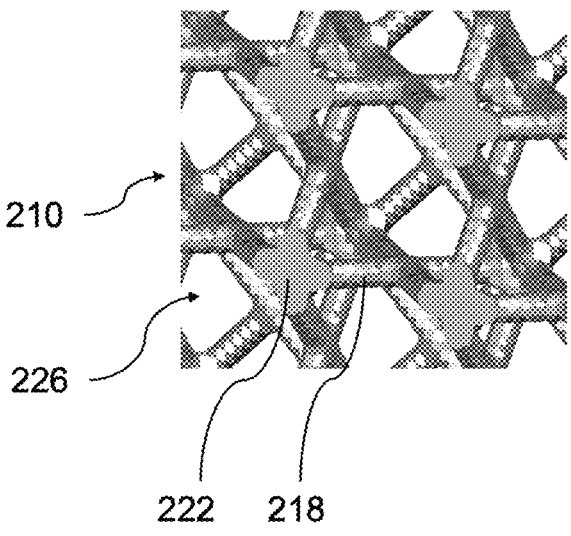
FIG. 8 is a perspective cross-sectional view of a portion of the internal structure of the seatbelt pad of FIG. 2.

Referring to FIGS. 4 and 8, the lattice structure 210 is a three-dimensional lattice defined by struts 218 that intersect at nodes 222 to define voids 226. The lattice structure 210 is a predefined structure having a predefined pattern. In other words, the lattice structure 210 is not a foam (i.e., a material produced by the introduction of gas bubbles during manufacture). The struts 218 and the nodes 222 are arranged such that the voids 226 are in fluid communication with one another. The lattice structure 210 is formed of a resilient material, i.e., a material with elasticity. In the example provided, thermoplastic polyurethane (TPU) is used, though other materials or composites of materials can be used. In the example provided, the lattice structure 210 is formed via an additive manufacturing process (e.g., three-dimensional printing).

The size and/or arrangement of the struts 218 and the nodes 222 can be configured to provide desired characteristics, such as stiffness or airflow through the voids 226. In one form, shown in FIG. 6, the size and arrangement can be generally uniform throughout the seatbelt pad 122. In another form, the size and/or arrangement can be different in different predetermined zones of the seatbelt pad 122 to provide different characteristics to those zones. In the example shown in FIG. 4, the size and/or arrangement is such that the stiffness of the seatbelt pad 122 is greater on the side of the seatbelt webbing 110 that faces away from the occupant than on the side that faces toward the occupant. In the example provided, the size of the voids 226 are larger on the side of the seatbelt webbing 110 that faces toward the occupant. As such, the seatbelt pad 122 can have a softer feel against the occupant's body. In one form, the size and/or arrangement can be such that the side of the seatbelt pad 122 facing the occupant has a durometer of 10 to 50 on the Shore A Hardness scale while the side facing away from the occupant has a durometer of 30 to 60 on the Shore A Hardness scale. In one specific example, the side facing the occupant can be a durometer of 30. In one specific example, the side facing away from the occupant can be a durometer of 60.

Any one or more of the following can be adjusted to tailor the stiffness and/or the airflow in predetermined zones within the seatbelt pad 122: the density of struts 218 per volume; size of voids 226; shape of voids 226; cross-sectional thickness of the struts 218; cross-sectional shape of struts 218; overall shape of struts 218; density of the material making up the struts 218; spacing of the struts 218; angles of struts 218; size of nodes 222; shape of nodes 222; type of material of struts 218; type of material of the nodes 222.

Figure 5:
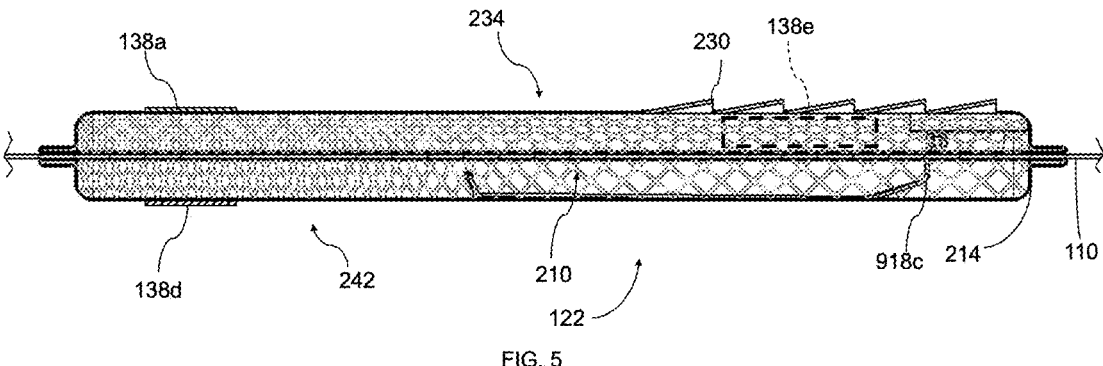
FIG. 5 is a cross-sectional view similar to FIG. 4, but illustrating an internal structure of the seatbelt pad having a second form according to the present disclosure.

In the example shown in FIG. 5, the size and/or arrangement of the lattice structure 210 is such that the density of the struts 218 per volume is lower (e.g., the voids 226 are larger) in a region near vents 230 that are open through the cover layer 214. This promotes more airflow in this region which can assist cooling of the occupant and/or cooling of the electrical components 138. In the example provided, the size and/or arrangement gradually changes from one size and/or arrangement to another, though other configurations can be used such as distinct adjacent regions that do not gradually transition therebetween. In this example, the size and/or arrangement of the lattice structure 210 is also such that the density of the struts 218 per volume is lower on the side of the seatbelt webbing 110 that faces the occupant to provide softer cushioning to the occupant, though other configurations can be used.

Figure 6:
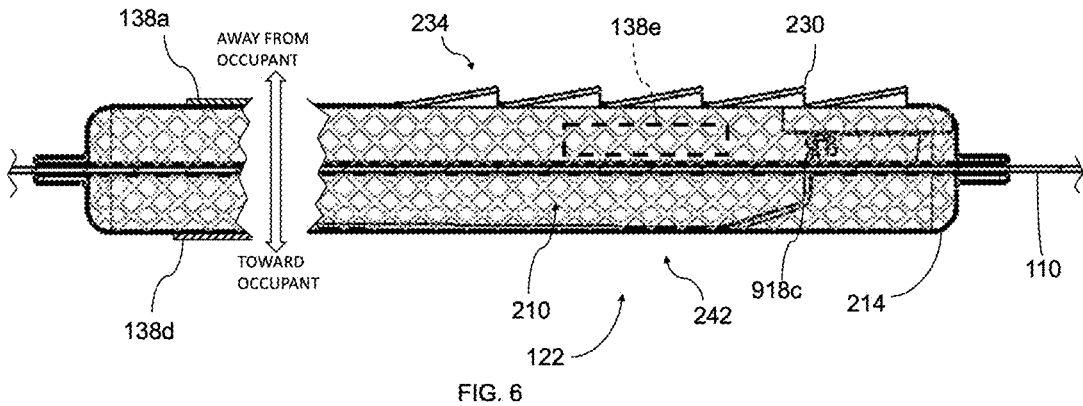
FIG. 6 is a cross-sectional view similar to FIG. 4, but illustrating an internal structure of the seatbelt pad having a third form according to the present disclosure.

In the example shown in FIG. 6, the size and/or arrangement of the lattice structure 210 is uniform throughout the seatbelt pad 122.

It should be noted that the stiffness of the seatbelt pad 122 can optionally be adjusted by varying other characteristics of the lattice structure 210 besides the size and/or arrangement thereof. For example, the density of the material or the type of material used for the struts 218 and/or the nodes 222 can be different in different predetermined regions while the size and/or arrangement of the lattice structure 210 is the same. As such, the size and/or arrangement of the lattice structure 210 may be chosen based on desired air flow characteristics and the stiffness may be controlled via these other characteristics. For example, the form shown in FIG. 6 may optionally still be stiffer on the side of the seatbelt webbing 110 that faces away from the occupant by adjusting the density or type of material that makes up the struts 218 and/or nodes 222 on that side of the lattice structure 210.

Figure 7:
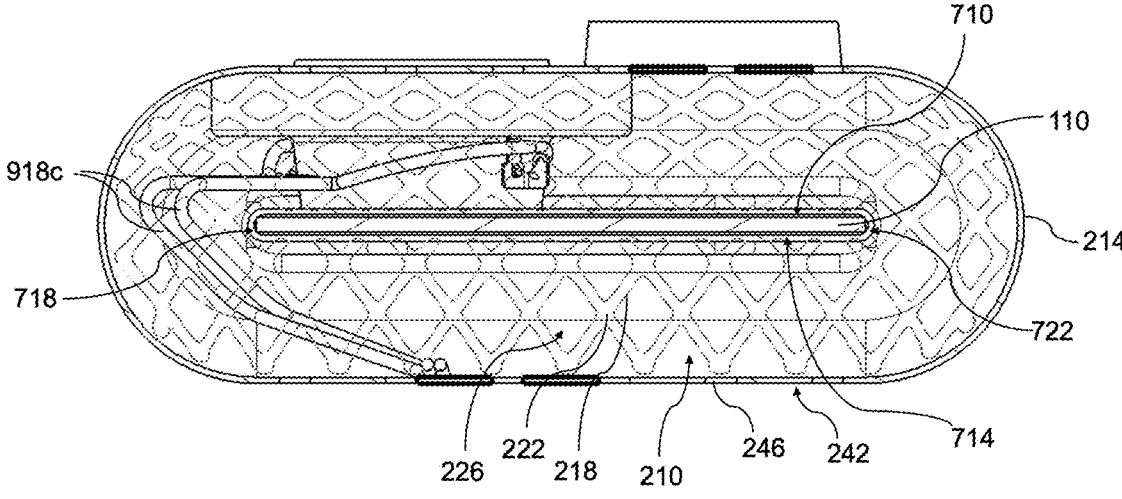
FIG. 7 is a cross-sectional view of the seatbelt pad of FIG. 2, taken along plane 7-7, shown in FIG. 3.

Referring to FIG. 7, the seatbelt pad 122 surrounds the entire perimeter of the seatbelt webbing 110, including the forward side 710, rearward side 714, top side 718, and bottom side 722 of the seatbelt webbing 110. In the example provided, the lattice structure 210 surrounds the entire perimeter of the seatbelt webbing 110. Thus, air can flow through the lattice structure 210 around the seatbelt webbing 110. The cover layer 214 can also surround the entire perimeter of the seatbelt webbing 110 to enclose the lattice structure 210.

Returning to FIG. 2, the cover layer 214 can surround the lattice structure 210 (FIG. 4). As such, the cover layer 214 can define an exterior of the seatbelt pad 122. In the example provided, the cover layer 214 and the lattice structure 210 may be formed by additive manufacturing (e.g., 3D printing). As such, the cover layer 214 may be integrally formed with the lattice structure 210. In one form, the cover layer 214 may have a generally smooth surface texture, though other configurations can be used. In one form, the cover layer 214 is formed of the same material as the lattice structure 210. In another form, the cover layer 214 is a different material than the lattice structure 210.

The cover layer 214 can optionally define a plurality of apertures through which air can flow between the exterior of the seatbelt pad 122 and the interior (i.e., the lattice structure 210). In the example shown, the cover layer 214 defines the vents 230. In the example shown, the vents 230 are large apertures formed by portions of the cover layer 214, on a forward side 234 (i.e., the side that faces away from the occupant) of the seatbelt pad 122, that ramp away from the forward side 234. The apertures of the vents 230 are formed through one leg of the ramped shape. In the example provided, there are a plurality of the vents 230 aligned in a row, though other configurations can be used. The forward side 234 of the cover layer 214 may also define a plurality of other apertures (referred to herein as forward apertures 238) in a different location than the vents 230 or instead of the vents 230. In the example provided, the forward apertures 238 are uniformly shaped circular apertures, though other configurations can be used, such as other shapes and/or the forward apertures 238 being non-uniform. The part of the cover layer 214 on a rearward side 242 (i.e., the side that faces toward the occupant) of the seatbelt pad 122 may also optionally include apertures (referred to herein as rear apertures 246; shown in FIG. 7), which may be similar to the forward apertures 238.

The first lighting component 138a can be disposed on an external surface of the forward side 234 of the seatbelt pad 122. The first electrical component 138a can be any suitable component configured to produce light, such as a flexible display screen for example and may include LEDs (light-emitting diodes) and/or a LCD (liquid-crystal display) or other types of display technologies. In the example provided, the first lighting component 138a is a flexible light emitting coating layer applied as a liquid to the external surface of the cover layer 214. In the example provided, the coating layer of the first lighting component 138a is less than or equal to 100 μm (i.e., 100 microns) thick. Some non-limiting examples of such liquid applied light emitting coatings and their processes of application can be found in U.S. Pat. Nos. 11,533,793; 9,642,212; and 8,470,388, the disclosures thereof are incorporated herein by reference in their entireties. One example of such a liquid applied light emitting coating is commercially known as LumiLor®, though other liquid applied light emitting coatings may be used.

The second lighting component 138b can be similar to the first lighting component 138a but located in a different location on the cover layer 214. In the example provided, the second lighting component 138b is spaced apart from the first lighting component 138a. In another form, not specifically shown, the second lighting component 138b can be adjacent to the first lighting component 138a. In one form, the first lighting component 138a is configured to emit a first color of light and the second lighting component 138b is configured to emit a second color of light that is different than the first color.

Referring to FIGS. 2 and 12, the speaker 138c can be any suitable device configured to emit sound. In the example provided, the speaker 138c is a device configured to convert electrical signals into sound waves. In another form, the speaker 138c can be a device configured to amplify existing sound waves or physical vibrations or to convert physical vibrations into audible sound waves, without electrical input, such as a resonance tube for example. In the example provided, the cover layer 214 can define additional apertures (referred to herein as speaker apertures 250) aligned with the speaker 138c to permit the sound waves to be emitted from the speaker 138c to the exterior of the seatbelt pad 122. In the example provided, the speaker 138c is embedded in the lattice structure 210 on the side of the seatbelt assembly 108 that faces away from the occupant, such as to provide an auditory experience to the occupant. In an alternative configuration, the speaker 138c can be embedded in the lattice structure 210 on the side of the seatbelt assembly 108 that faces toward the occupant, such as to provide a tactile experience to the occupant.

Referring to FIG. 4, the sensor 138d can be any type of sensor configured to detect one or more conditions or characteristics. Some non-limiting examples include a temperature sensor, a heart rate sensor, a pressure or force sensor, and an accelerometer. In the example provided, the sensor 138d is a biometric sensor configured to sense one or more biological characteristics (e.g., heart rate, temperature, perspiration) of the occupant, though other types of sensors can be used.

In the example provided, the sensor 138d is located on an external surface of the rearward side 242 of the cover layer 214. In another form, not specifically shown, the sensor 138d can be located within the lattice structure 210. In still another form, not specifically shown, the sensor 138d can be located on the external surface of the forward side 234 or elsewhere on the exterior of the cover layer 214. In another form, not specifically shown, the sensor 138d can be located on an interior surface of the cover layer 214, between the cover layer 214 and the lattice structure 210. In still another form, not specifically shown, the sensor 138d can be embedded in the cover layer 214 such that a layer of the cover layer 214 is between the sensor 138d and the exterior of the seatbelt pad 122 and a layer of the cover layer 214 is between the sensor 138d and the lattice structure 210.

The fan 138e is configured to use electrical power to move air through the seatbelt pad 122. The fan 138e can be embedded in the lattice structure 210. In the example provided, the fan 138e can be located proximate the apertures (e.g., vents 230, forward apertures 238, or rear apertures 246) and configured to direct air flow through those apertures.

Referring back to FIG. 1, the one or more electrical components 138 (e.g., the first through fifth electrical components 138a-138e shown in FIGS. 2-4) can be connected in any suitable manner to the power source 134 and/or the controller 130 to receive power and/or electrical signals therefrom.

Figure 9:
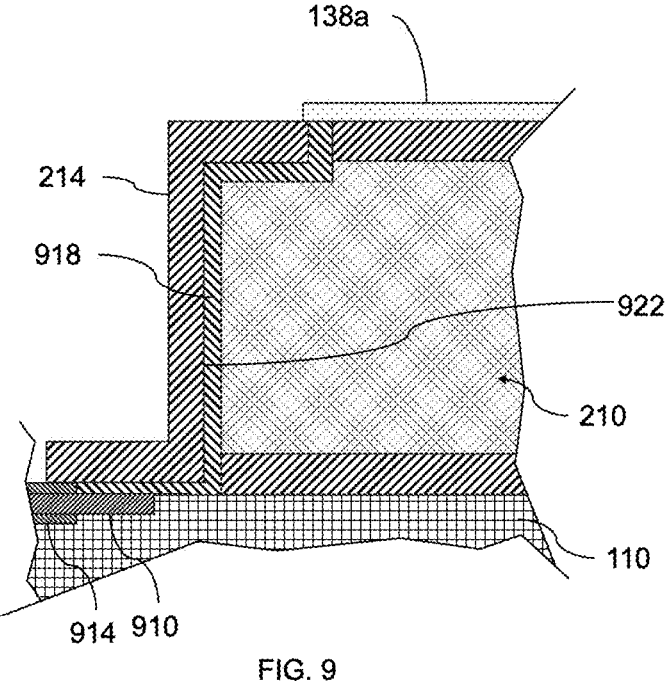
FIG. 9 is a schematic cross-sectional view of a portion of the seatbelt pad of FIG. 2, illustrating one configuration of an electronic connection for an electronic device of the seatbelt pad, according to the present disclosure.

With additional reference to FIG. 9, a plurality of electrical conductors 910 (only one shown for ease of illustration) can extend along the seatbelt webbing 110 from the power source 134 and/or controller 130 to the seatbelt pad 122.

In one form, the plurality of electrical conductors 910 can be cables or wires that are woven into the seatbelt webbing 110, stitched thereon, or otherwise attached to the seatbelt webbing 110. In another form, the plurality of electrical conductors 910 can be formed by electrically conductive ink deposited on or infused into the seatbelt webbing 110. One non-limiting example of such liquid applied conductive materials and their processes of application can be found in U.S. Pat. No. 11,680,180; the disclosure thereof is incorporated herein by reference in its entirety. One non-limiting example of such conductive ink is commercially known as Liquid X®, though other conductive liquids can be applied to the seatbelt webbing 110.

The electrical conductor 910 can optionally be encased in a sheath 914 that is electrically insulating.

The seatbelt pad 122 can include a plurality of second electrical conductors 918 (only one shown for ease of illustration) that connect the plurality of electrical conductors 910 to the electrical components 138. In FIG. 9, the second electrical conductor 918 is schematically illustrated and described herein as connecting the electrical conductor 910 to the first lighting component 138a for ease of illustration and explanation but those of skill in the art will appreciate that any of the electrical components 138 (e.g., 138a-138e) can be connected in a similar manner.

In the example provided, the second electrical conductor 918 is a conductive ink layer on one or more interior surfaces 922 of the cover layer 214. In one form, the second electrical conductor 918 can be applied as a liquid and may be a material and/or process similar to that described in U.S. Pat. No. 11,680,180. One non-limiting example of such conductive ink is commercially known as Liquid X®, though other conductive liquids can be applied to the cover layer 214.

One end of the second electrical conductor 918 is connected to the electrical conductor 910 and the other end of the second electrical conductor 918 is connected to the first lighting component 138a. The second electrical conductor 918 can pass through the cover layer 214 to connect to the first lighting component 138a.

In another form, not specifically shown, the second electrical conductor 918 can be liquid-applied or 3D-printed onto or into select ones of the struts 218 (FIGS. 4, 7, and 8) and the nodes 222 (FIGS. 4, 7, and 8) while the lattice structure 210 is being formed to produce an electrically conductive path through the lattice structure 210.

Figure 10:
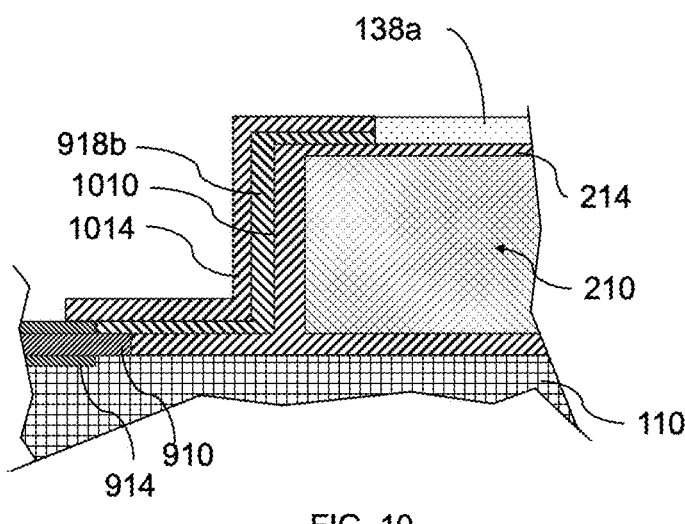
FIG. 10 is a schematic cross-sectional view of a portion of the seatbelt pad of FIG. 2, illustrating another configuration of an electronic connection for an electronic device of the seatbelt pad, according to the present disclosure.

Referring to FIG. 10, another form of the second electrical conductor 918 is illustrated and indicated by reference numeral 918b. This example can be similar to the form of FIG. 9 except as otherwise shown or described herein. As such only differences are described in detail. In this form, the second electrical conductor 918 can be applied to one or more exterior surfaces 1010 of the cover layer 214. An electrically insulating layer 1014 may then be applied over the second electrical conductor 918 to encapsulate the second electrical conductor 918. The electrically insulating layer 1014 can be a different material than the cover layer

214 or can be the same. If applicable, the second electrical conductor 918 may pass through the cover layer 214.

Referring to FIG. 11, another form of the second electrical conductor 918 is illustrated and indicated by reference numeral 918c. This example can be similar to that of FIGS. 9 and 10 except as otherwise shown or described herein. As such only differences are described in detail. In this form, the second electrical conductor 918 can be at least partially a cable or wire that extends through the voids 226 of the lattice structure 210 to connect the electrical conductor 910 to the electrical component 138a. The second electrical conductor 918 can pass through the cover layer 214 or a connector 1110 can extend through the cover layer 214 and connect the first lighting component 138a to the second electrical conductor 918.

The forms shown in FIGS. 9-11 can be used together. For example, when more than one electrical component 138 is used, they can be connected via the same form of second electrical conductor 918 or different forms of the second electrical conductor 918. In the example shown in FIGS. 2-7, the first lighting component 138a, second lighting component 138b, sensor 138d are connected using the form of FIG. 9 or 10, while the speaker 138c and fan 138e are connected using the form of FIG. 11, though other configurations can be used.

Referring back to FIG. 1, the controller 130 can control the one or more electrical components 138 based on any number of criteria.

In one example, the controller 130 can be configured to control illumination of the lighting components (e.g., first lighting component 138a and second lighting component 138b) based on the status of one or more components of the vehicle 100. For example, to illuminate one of the lighting components (e.g., first lighting component 138a) to be a first color (e.g., red, orange, yellow) based on a status of the seatbelt assembly 108 (e.g., not fully buckled) and to illuminate a different lighting component (e.g., the second lighting component 138b) with a different color (e.g., green, blue) when the seatbelt assembly 108 has a different status (e.g., fully buckled).

In one form, the controller 130 may operate the speaker 138c to emit sounds (e.g., emulating engine noise) in response to a condition of the engine (e.g., revolutions per minute). In another form, the controller 130 may control the speaker 138c to emit sub-sonic vibrations to be felt by the occupant. In another form, the controller 130 may operate the speaker 138c to emit music, verbal commands, or verbal information.

In one form, the controller 130 may operate the fan 138e based on signals from the sensor 138d or another sensor (not shown) in the vehicle. For example, the controller 130 may turn on the fan 138e when a temperature of the occupant, as indicated by the sensor 138d rises above a predetermined temperature or if a temperature of the interior of the vehicle 100 rises above a predetermined temperature.

In one form, the controller 130 sends signals from the sensor 138d to a remote device (not shown) such as a mobile phone or a cloud-based server.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seatbelt assembly comprising:
a seatbelt webbing; and
a pad attached to the seatbelt webbing, the pad having a generally annular shape that defines a main aperture extending through the pad in a longitudinal direction of the pad, wherein a portion of the seatbelt webbing extends through the main aperture, wherein the pad comprises:
a lattice structure that surrounds the main aperture, wherein the lattice structure is formed of a resilient material and defines a plurality of openings that permit airflow through the lattice structure; and
a cover layer disposed about the lattice structure.

2. The seatbelt assembly of claim 1, wherein the lattice structure has a first region that has a first lattice geometry and a second region that has a second lattice geometry, wherein the first lattice geometry is denser than the second lattice geometry.

3. The seatbelt assembly of claim 2, wherein the seatbelt webbing is disposed between the first and second regions.

4. The seatbelt assembly of claim 2, wherein the first region is located closer to a first longitudinal end of the pad than the second region.

5. The seatbelt assembly of claim 2, wherein the cover layer defines a plurality of vent apertures that provide fluid communication between the lattice structure and an exterior of the pad, wherein the second region is aligned with the vent apertures.

6. The seatbelt assembly of claim 1, wherein the cover layer defines a plurality of vent apertures that provide fluid communication between the lattice structure and an exterior of the pad.

7. The seatbelt assembly of claim 1, wherein the lattice structure is a same material as the cover layer, wherein the lattice structure and the cover layer are formed via an additive manufacturing process.

8. The seatbelt assembly of claim 1, wherein the cover layer includes a plurality of flanges that extend in the longitudinal direction, the plurality of flanges being attached directly to the seatbelt webbing.

9. The seatbelt assembly of claim 1, wherein the pad further comprises an electronic device and the seatbelt webbing includes at least two conductors, the at least two conductors in electrical communication with the electronic device and configured to provide power to the electronic device.

10. The seatbelt assembly of claim 9, further comprising a first wire and a second wire, wherein the first and second wires extend through the plurality of openings defined by the lattice structure to electrically couple the at least two conductors to the electronic device.

11. The seatbelt assembly of claim 9, wherein the pad further includes at least two conductive ink traces, wherein the at least two conductive ink traces are printed on or within the cover layer and electrically couple the at least two conductors to the electronic device.

12. The seatbelt assembly of claim 9, wherein the electronic device includes an electroluminescent layer disposed on or within the cover layer.

13. The seatbelt assembly of claim 9, wherein the electronic device includes a speaker.

14. The seatbelt assembly of claim 9, wherein the electronic device includes a sensor.

15. The seatbelt assembly of claim 9, wherein the electronic device includes a fan, the fan configured to draw air through the lattice structure.

16. The seatbelt assembly of claim 9, wherein the electronic device includes a resistance heating element.

17. The seatbelt assembly of claim 1, wherein the pad further comprises a resonance chamber, the resonance chamber having a predetermined natural frequency configured to vibrate in response to a predetermined vehicle noise or vibration.

18. A seatbelt assembly comprising:
a seatbelt webbing including at least two conductors; and
a pad attached to the seatbelt webbing, the pad having a generally annular shape that defines a main aperture extending through the pad in a longitudinal direction of the pad, wherein a portion of the seatbelt webbing extends through the main aperture, wherein the pad comprises:
a lattice structure that surrounds the main aperture, wherein the lattice structure is formed of a resilient material and defines a plurality of openings that permit airflow through the lattice structure;

a cover layer disposed about the lattice structure, the cover layer defining a plurality of vent apertures that provide fluid communication between the lattice structure and an exterior of the pad; and an electronic device coupled to the at least two conductors to receive power therefrom, the electronic device including at least one of a speaker and an electroluminescent layer disposed on or within the cover layer.

19. The seatbelt assembly of claim 18, wherein the lattice structure has a first region that has a first lattice geometry and a second region that has a second lattice geometry, wherein the first lattice geometry is denser than the second lattice geometry.

20. The seatbelt assembly of claim 18, wherein the pad further includes at least two conductive ink traces, wherein the at least two conductive ink traces are printed on or within the cover layer and electrically couple the at least two conductors to the electronic device.

\* \* \* \* \*